United States Patent
Resh et al.

(10) Patent No.: US 9,243,702 B2
(45) Date of Patent: Jan. 26, 2016

(54) TORQUE CONVERTER BLADE TAB UNDERCUTS

(75) Inventors: Michael L. Resh, Massillon, OH (US); Randy L. Keller, Polk, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 819 days.

(21) Appl. No.: 13/548,987

(22) Filed: Jul. 13, 2012

(65) Prior Publication Data
US 2013/0022470 A1    Jan. 24, 2013

Related U.S. Application Data

(60) Provisional application No. 61/508,810, filed on Jul. 18, 2011.

(51) Int. Cl.
*F16H 41/24* (2006.01)
*F16H 41/28* (2006.01)

(52) U.S. Cl.
CPC .......... *F16H 41/28* (2013.01); *Y10T 29/49236* (2015.01)

(58) Field of Classification Search
CPC ...................................................... F16H 41/28
USPC ........................................... 60/367, 330, 338
See application file for complete search history.

(56) References Cited

U.S. PATENT DOCUMENTS

| 2,311,958 | A | * | 2/1943 | Neracher et al. | 60/367 |
| 2,890,661 | A | * | 6/1959 | Egbert | 416/180 |
| 8,434,300 | B2 | * | 5/2013 | Marathe | 60/366 |
| 2007/0258820 | A1 | | 11/2007 | Uhler et al. | |
| 2009/0241533 | A1 | | 10/2009 | Marathe | |

* cited by examiner

*Primary Examiner* — Dwayne J White
*Assistant Examiner* — Jason Fountain
(74) *Attorney, Agent, or Firm* — Simpson & Simpson, PLLC

(57) ABSTRACT

A blade for a torque converter, including: a body with first and second blade side surfaces and a blade edge surface connecting the first and second blade side surfaces; and a tab extending from the blade edge surface and arranged for insertion through an opening in a core ring for the torque converter. The tab includes: a distal end furthest from the blade edge surface; first and second tab edge surfaces in communication with the distal end; and first and second indentations in the first and second tab edge surfaces, respectively, between the distal end and the blade edge surface. The core ring forms at least respective portions of respective inner circumferences for a turbine and pump for the torque converter. After insertion through the opening, the tab is arranged to be bent along a line connecting the indentations so that a portion of the tab engages the core ring.

15 Claims, 5 Drawing Sheets

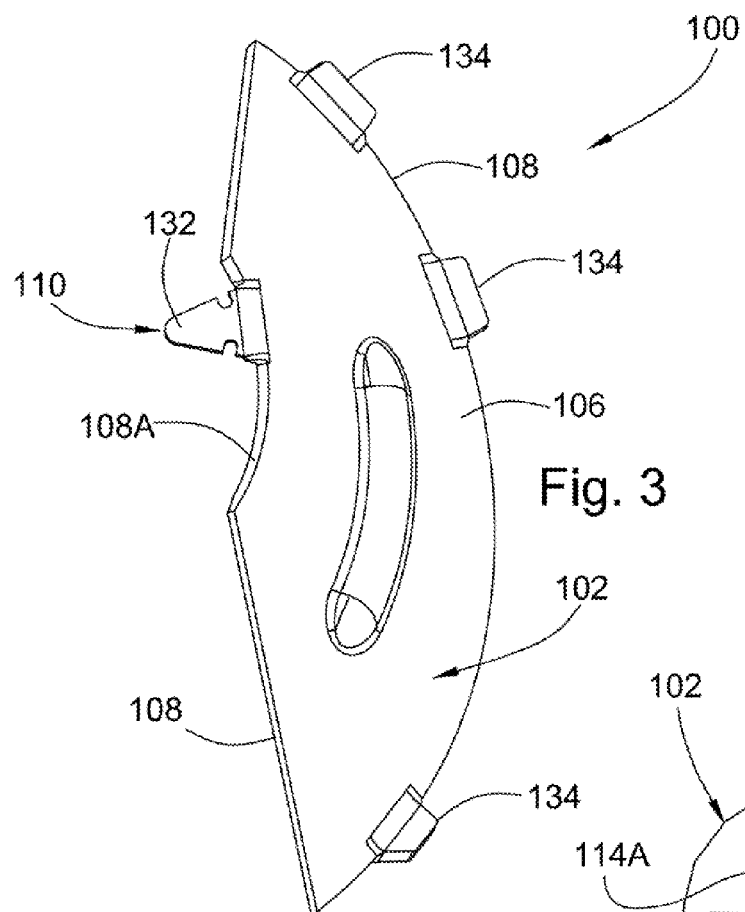
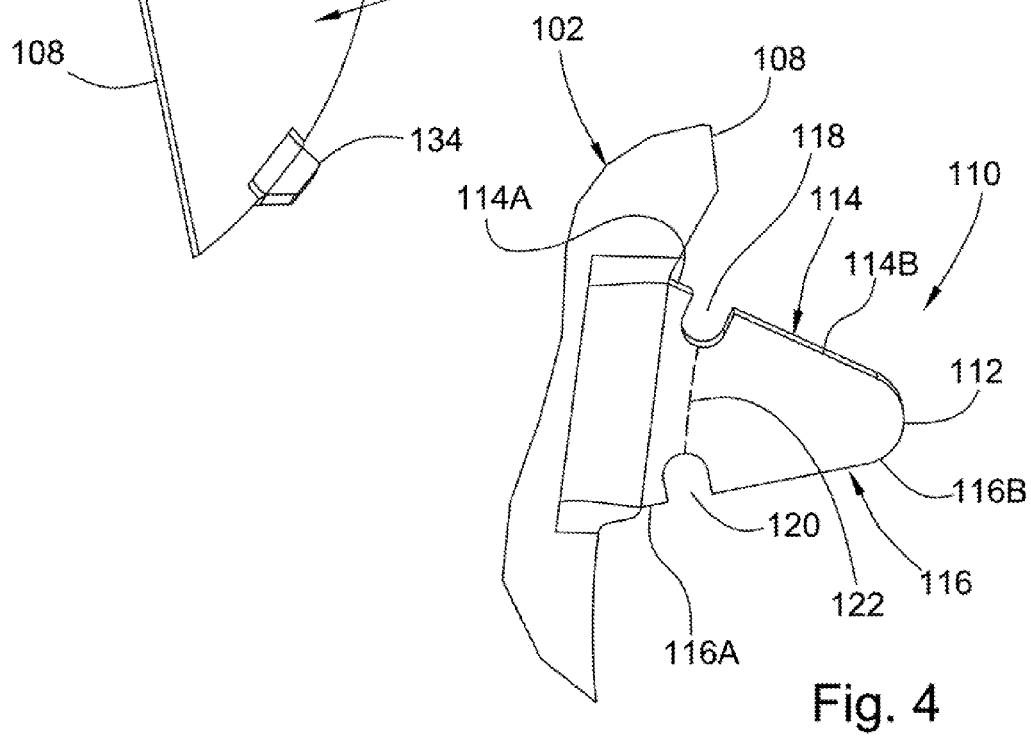

TORQUE CONVERTER BLADE TAB UNDERCUTS

CROSS-REFERENCE TO RELATED APPLICATIONS

This application claims the benefit under 35 U.S.C. §119(e) of U.S. Provisional Patent Application No. 61/508,810 filed Jul. 18, 2011 which application is incorporated herein by reference.

TECHNICAL FIELD

The present disclosure relates to a blade for a torque converter requiring less force for connection to a core ring for the torque converter. Specifically, the disclosure relates to a blade with undercuts at a tab to reduce the force needed to bend the tab to secure the blade to the core ring.

BACKGROUND

It is known to insert solid tabs for blades through a core ring for a torque converter and to bend the tabs to secure the blades to the core ring. Bending the solid tabs can require a significant amount of force, which can cause the blade to be displaced, changing blade angles and affecting characteristics of the torque converter dependent upon blade configuration.

SUMMARY

According to aspects illustrated herein, there is provided a blade for a torque converter, including: a body with first and second blade side surfaces and a blade edge surface connecting the first and second blade side surfaces; and a first tab extending from the blade edge surface and arranged for insertion through an opening in a core ring for the torque converter. The first tab includes: a distal end furthest from the blade edge surface; first and second tab edge surfaces in communication with the distal end; and first and second indentations in the first and second tab edge surfaces, respectively, between the distal end and the blade edge surface. The core ring forms at least respective portions of respective inner circumferences for a turbine and pump for the torque converter. After insertion through the opening, the first tab is arranged to be bent along a line connecting the first and second indentations so that a portion of the first tab engages the core ring.

According to aspects illustrated herein, there is provided a torque converter, including: a turbine with a turbine shell; a pump with a pump shell; a core ring with an opening passing through the core ring; and a blade including: a body with a blade edge surface; at least one first tab extending from the blade edge surface and connected to the pump shell or the turbine shell; and a second tab extending from the blade edge surface and partially disposed within the opening in the core ring. The second tab includes: a distal end; first and second tab edge surfaces converging at the distal end; and first and second indentations in the first and second tab edge surfaces, respectively, between the distal end and the blade edge surface. The second tab is bent along a line connecting the first and second indentations so that a portion of the second tab engages the core ring.

According to aspects illustrated herein, there is provided a method of forming a blade for a torque converter, including: forming a body with first and second blade side surfaces and a blade edge surface connecting the first and second blade side surfaces; forming a first tab extending from the blade edge surface and including a distal end furthest from the blade edge surface; forming, on the first tab, first and second tab edge surfaces in communication with the distal end; and forming first and second indentations in the first and second tab edge surfaces, respectively, between the distal end and the blade edge surface. The first tab is arranged for insertion through an opening in a core ring for the torque converter. The core ring forms at least respective portions of respective inner circumferences for a turbine and pump for the torque converter. After insertion through the opening, the first tab is arranged to be bent along a line connecting the first and second indentations so that a portion of the first tab engages the core ring.

According to aspects illustrated herein, there is provided a method of assembling a torque converter including: a turbine with a turbine shell; a pump with a pump shell; and a core ring disposing between the turbine shell and the pump shell and including an opening passing through the core ring. The method includes: forming a body of a blade with a blade edge surface; forming at least one first tab extending from the blade edge surface; forming a second tab extending from the blade edge surface. The second tab includes: a distal end; first and second tab edge surfaces connected to the blade edge surface at first and second connecting areas, respectively, and in communication with the distal end; and first and second indentations in the first and second tab edge surfaces, respectively, between the distal end and the first and second connecting areas, respectively. The method includes: connecting the at least one first tab to the pump shell or the turbine shell; partially disposing the second tab in the opening; and bending the second tab along a line connecting the first and second indentations so that a portion of the second tab engages the core ring.

These and other objects and advantages of the present disclosure will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 3 is an alternate perspective view of the blade shown in FIG. 2;

FIG. 4 is a detail of area 4 in FIG. 2;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
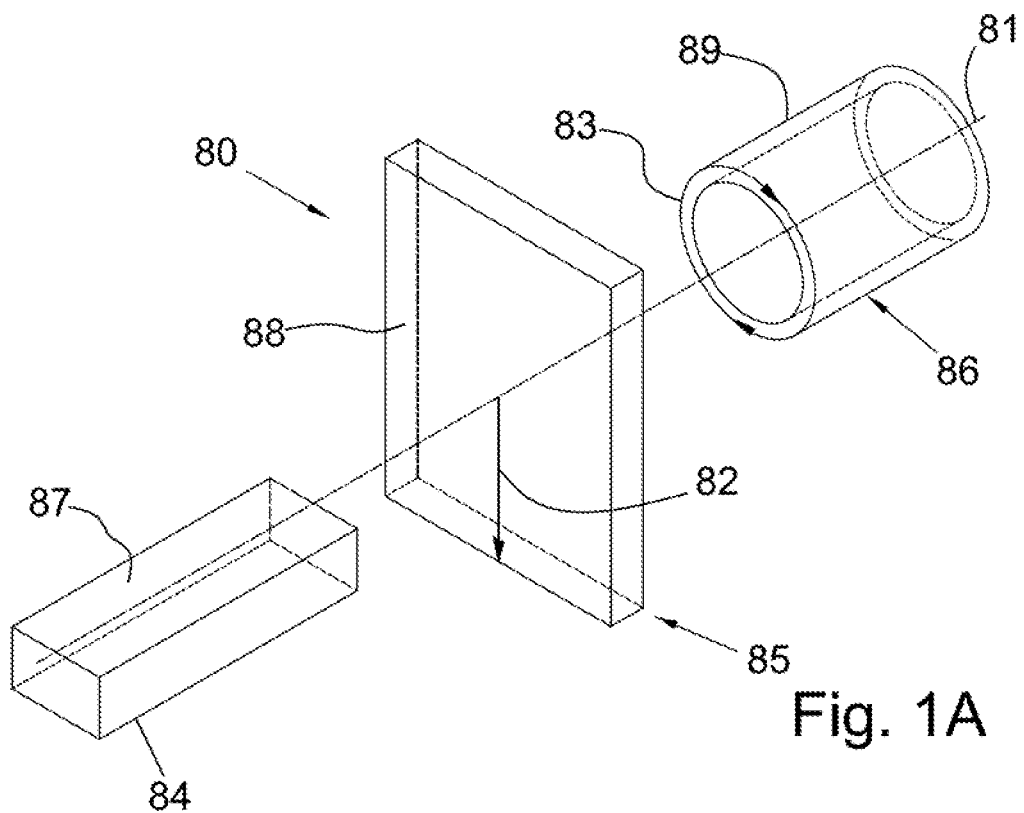
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
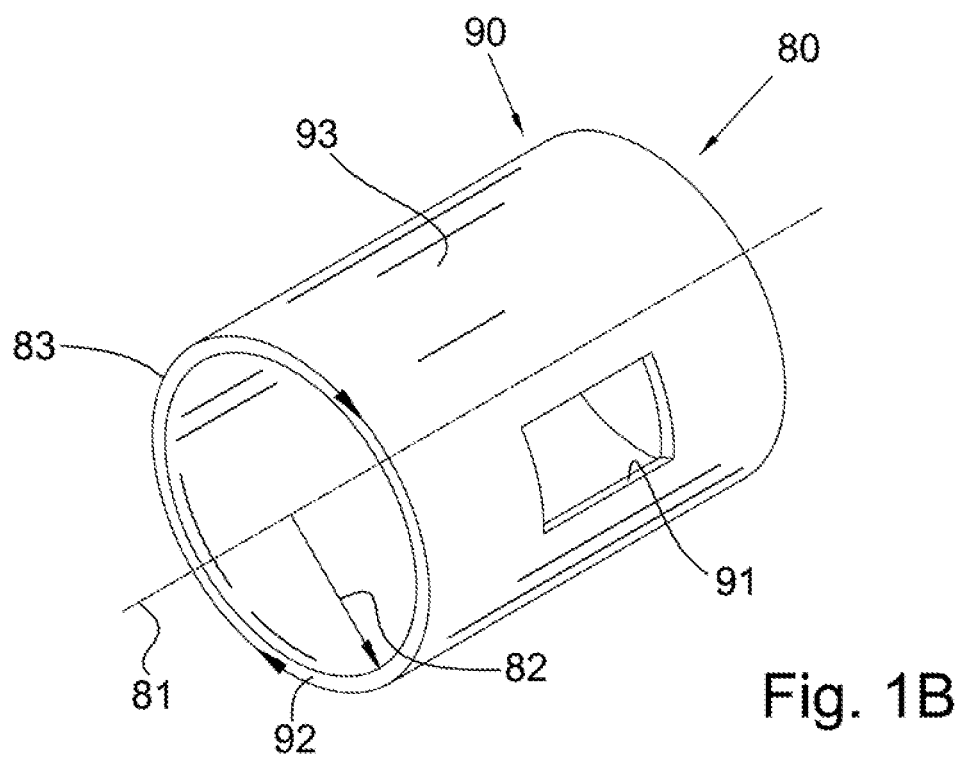
FIG. 1B is a perspective view of an object in the cylindrical coordinate system of FIG. 1A demonstrating spatial terminology used in the present application; and, FIG. 2 is a perspective view of a blade with tab undercuts.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
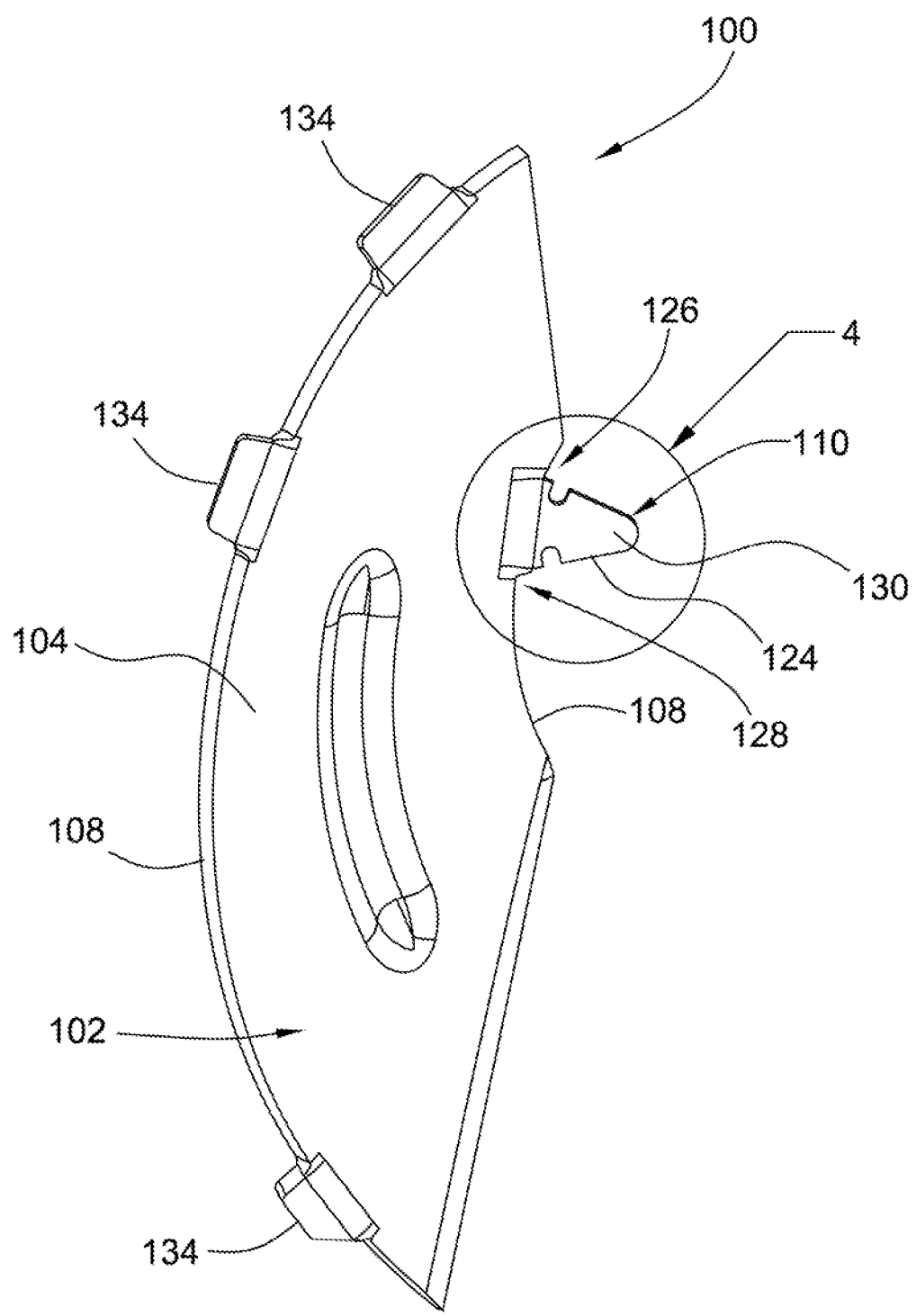

FIG. 2 is a perspective view of blade 100 with tab undercuts.

FIG. 3 is an alternate perspective view of blade 100 shown in FIG. 2.

FIG. 4 is a detail of the tab with undercuts shown in FIG. 2. The following should be viewed in light of FIGS. 2 through 4. Blade 100 for a torque converter includes body 102 with blade side surfaces 104 and 106 and blade edge surface 108 connecting the blade side surfaces. The blade includes tab 110 extending from blade edge surface 108 and arranged for insertion through an opening in a core ring for the torque converter as further described below. Tab 110 includes distal end 112 furthest from blade edge surface 108 and tab edge surfaces 114 and 116 in communication with the distal end. In an example embodiment, tab edge surfaces 114 and 116 converge at the distal end Indentations 118 and 120 are located in the tab edge surfaces 114 and 116, respectively, between the distal end and blade edge surface 108.

The core ring forms at least respective portions of respective inner circumferences for a turbine and pump for the torque converter, and after insertion through the opening, tab 110 is arranged to be bent along line 122 connecting indentations 118 and 120 so that portion 124 of the tab 110 engages the core ring.

In an example embodiment, tab edge surfaces 114 and 116 are connected to blade edge surface 108 at connecting areas 126 and 128, respectively, and indentations 118 and 120 are located between the distal end and connecting areas 126 and 128, respectively. In an example embodiment, tab edge surface 114 includes portion 114A between indentation 118 and connection area 126, and portion 114B between the distal end and indention 118. In an example embodiment, portions 114A and 114B are aligned. For example, the respective surfaces forming portions 114A and 114B are co-planar. In an example embodiment, tab edge surface 116 includes portion 116A between indentation 120 and connection area 128, and portion 116B between the distal end and indention 120. In an example embodiment, portions 116A and 116B are aligned. For example, the respective surfaces forming portions 116A and 116B are co-planar.

In an example embodiment, tab 110 includes tab side surfaces 130 and 132 continuous with blade side surfaces 104 and 106, respectively, and one of tab side surfaces 130 or 132 is arranged to engage the core ring.

In an example embodiment, body 102 includes at least one tab 134 extending from blade edge surface 108 and arranged to engage a turbine shell or a pump shell for the turbine or the pump, respectively, as further described below.

Figure 5A:
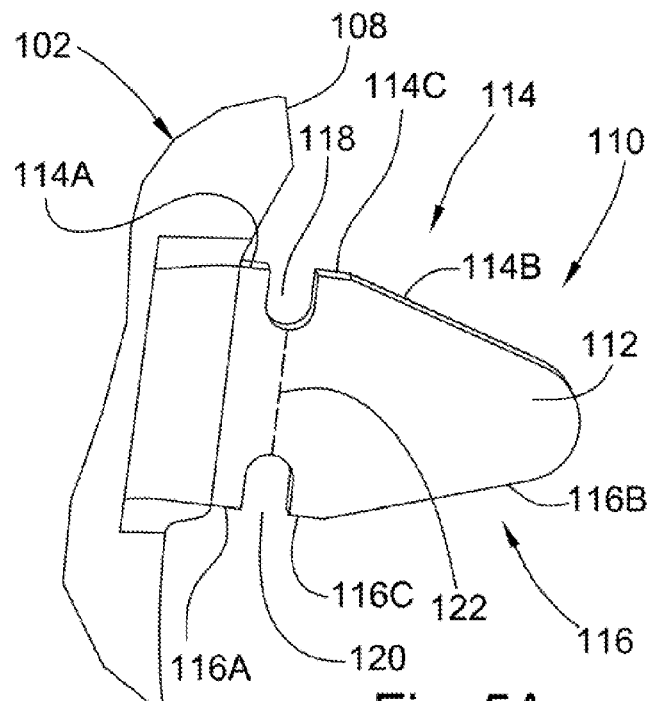
FIGS. 5A and 5B are details of exemplary embodiments of a tab with undercuts; and, FIG. 6 is a partial cross-sectional view of a torque converter with a blade with tab undercuts.
Figure 5B:
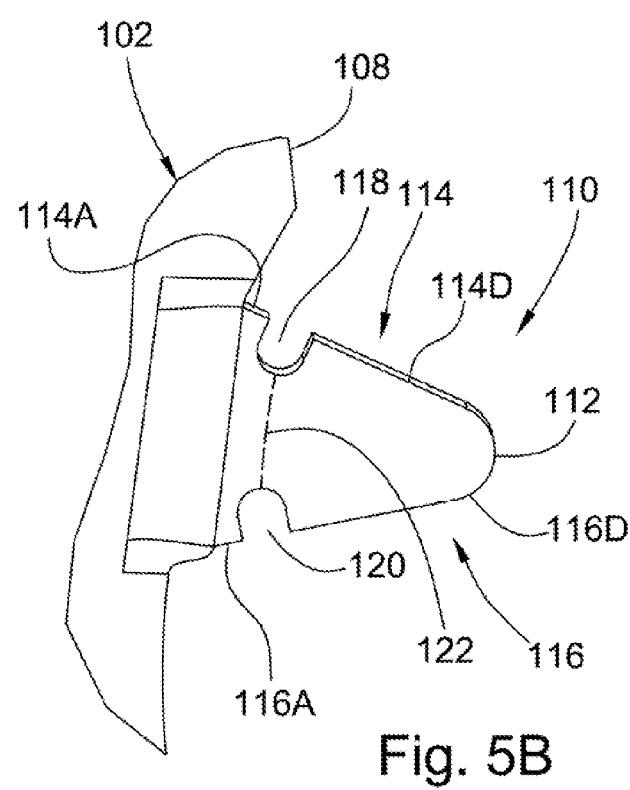

FIGS. 5A and 5B are respective details of exemplary embodiments of a tab with undercuts. In FIG. 5A, portions 114C and 116C of edges 114 and 116, respectively, are substantially parallel. In FIG. 5B, portions 114A and 114D and portions 116A and 116D of edges 114 and 116, respectively, are not aligned.

Figure 6:
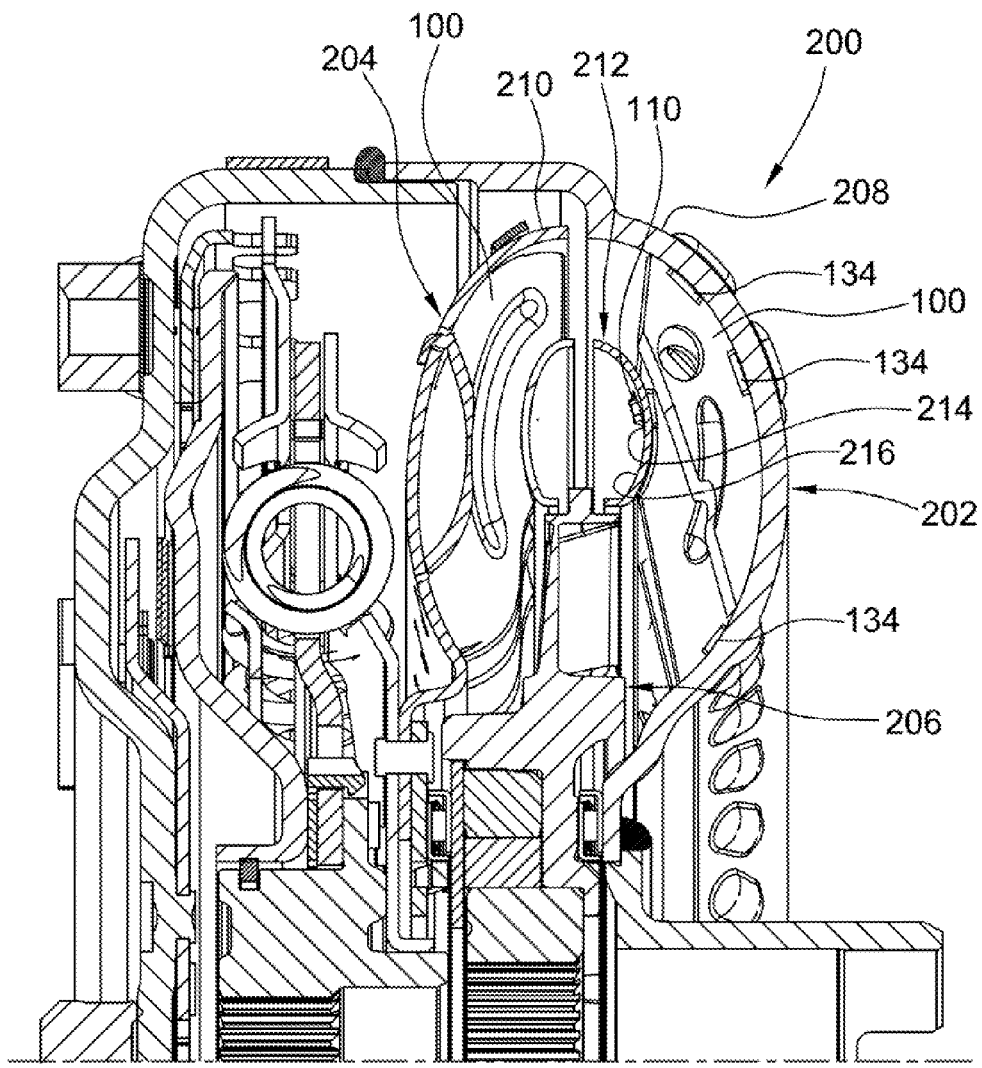

FIG. 6 is a partial cross-sectional view of torque converter 200 with blade 100 with tab undercuts. The following should be viewed in light of FIGS. 2 through 6. Torque converter 200 includes pump 202, turbine 204, and stator 206. Stator 206 is for multiplying torque as is commonly known in the art. Pump 202 includes pump shell 208 and turbine 204 includes turbine shell 210. Converter 200 also includes core ring 212 with openings 214. The core ring forms at least a portion of the respective inner circumferences for the pump and turbine. It is understood that the pump and turbine includes respective pluralities of blades. In FIG. 5, blades 100 are installed in both the pump and the turbine. However, it should be understood that blades 100 could be installed in only one of the pump or the turbine. Due to the location of the cross-section line for FIG. 5, tabs 110 and 134 are not visible for blade 100 in the turbine. Tabs 110 extend through openings 214 and are bent over such that portion 124 of the tab contacts inner surface 216 of the core ring. Tabs 134 are used to connect the blades to the pump shell and the turbine shell.

Although blade 100 has been shown with a particular shape and configuration, for example, position of tabs 110 and 134, it should be understood blade 100 is not limited to the particular shape and configuration shown and that other shapes and configurations are possible. For example, tab 110 could be located on a different portion of section 108A of the blade edge surface, tab 100 could have different proportions, or tabs 134 could vary in number, shape, or location. Although torque converter 200 has been shown with a particular configuration and set of components, it should be understood that torque converter 200 is not limited to the particular configuration and set of components shown and that other configurations and sets of components are possible. In general, blade 100 can be used with any hydraulic torque transfer device having a turbine and/or a pump.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A blade for a torque converter, comprising:
   a body with first and second blade side surfaces and a blade edge surface connecting the first and second blade side surfaces; and,
   a first tab extending from the blade edge surface and arranged for insertion through an opening in a core ring for the torque converter, the first tab including:
      a distal end furthest from the blade edge surface;
      first and second tab edge surfaces in communication with the distal end; and,
      first and second indentations in the first and second tab edge surfaces, respectively, between the distal end and the blade edge surface, wherein:
   the first and second indentations are separated from the blade edge surface by respective portions of the first and second tab edge surfaces;
   the core ring forms at least respective portions of respective inner circumferences for a turbine and pump for the torque converter; and,
   after insertion through the opening, the first tab is arranged to be bent along a line connecting the first and second indentations so that a portion of the first tab engages the core ring.

2. The blade of claim 1, wherein:
   the first and second tab edge surfaces are connected to the blade edge surface at first and second connecting areas, respectively; and,
   the first and second indentations are located between the distal end and the first and second connecting areas, respectively.

3. The blade of claim 2, wherein:
   the first tab edge surface includes a first portion between the first indentation and the first connection area, and a second portion between the distal end and the first indention; and,
   the first and second portions are aligned.

4. The blade of claim 2, wherein:
   the second tab edge surface includes a first portion between the second indentation and the second connection area, and a second portion between the distal end and the second indention; and,
   the first and second portions are aligned.

5. The blade of claim 1, wherein:
   the first tab includes first and second tab side surfaces continuous with the first and second blade side surfaces, respectively; and,
   the first or second tab side surface is arranged to engage the core ring.

6. The blade of claim 1, wherein the body includes at least one second tab extending from the blade edge surface and arranged to engage a turbine shell or a pump shell for the turbine or the pump, respectively.

7. A torque converter, comprising:
   a turbine with a turbine shell;
   a pump with a pump shell;
   a core ring with an opening passing through the core ring; and,
   a blade including:
      a body with a blade edge surface;
      at least one first tab extending from the blade edge surface and connected to the pump shell or the turbine shell; and,
      a second tab extending from the blade edge surface and partially disposed within the opening in the core ring, the second tab including:
         a distal end;
         first and second tab edge surfaces in communication with the distal end; and,
         first and second indentations in the first and second tab edge surfaces, respectively, between the distal end and the blade edge surface, wherein:
   the second tab is bent along a line connecting the first and second indentations so that a portion of the second tab engages the core ring; and,
   the first and second indentations are separated from the blade edge surface by respective portions of the first and second tab edge surfaces.

8. The torque converter of claim 7, wherein:
   the first and second tab edge surfaces are connected to the blade edge surface at first and second connecting areas, respectively; and,
   the first and second indentations are located between the distal end and the first and second connecting areas, respectively.

9. The torque converter of claim 8, wherein:
   the first tab edge surface includes a first portion between the first indentation and the first connection area, and a second portion between the distal end and the first indention; and,
   the first and second portions are aligned.

10. The torque converter of claim 8, wherein:
    the second tab edge surface includes a first portion between the second indentation and the second connection area, and a second portion between the distal end and the second indention; and,
    the first and second portions are aligned.

11. The torque converter of claim 7, wherein:
    the blade includes first and second blade side surfaces connected by the blade edge surface;
    the second tab includes first and second tab side surfaces continuous with the first and second blade side surfaces, respectively; and,
    the first or second tab side surface engages the core ring.

12. A method of assembling a torque converter including: a turbine with a turbine shell; a pump with a pump shell; and a core ring disposing between the turbine shell and the pump shell and including an opening passing through the core ring, the method comprising:
    forming a body of a blade with a blade edge surface;
    forming at least one first tab extending from the blade edge surface;
    forming a second tab extending from the blade edge surface and including:
       a distal end;
       first and second tab edge surfaces connected to the blade edge surface at first and second connecting areas, respectively, and in communication with the distal end; and,
    first and second indentations in the first and second tab edge surfaces, respectively, between the distal end and the first and second connecting areas, respectively, the first and second indentations separated from the blade edge surface by respective portions of the first and second tab edge surfaces;

connecting the at least one first tab to the pump shell or the turbine shell;
partially disposing the second tab in the opening; and,
bending the second tab along a line connecting the first and second indentations so that a portion of the second tab engages the core ring.

13. The method of claim 12, wherein:
forming the body of the blade includes forming first and second blade side surfaces connected by the blade edge surface;
forming the second tab includes forming first and second tab side surfaces continuous with the first and second blade side surfaces, respectively; and,
bending the second tab includes bending the second tab such that the first or second tab side surface engages the core ring.

14. The method of claim 12, wherein forming the first tab edge surface includes:
forming a first portion between the first indentation and the first connection area, and a second portion between the distal end and the first indention; and,
aligning the first and second portions.

15. The method of claim 12, wherein forming the second tab edge surface includes:
forming a first portion between the second indentation and the second connection area, and a second portion between the distal end and the second indention; and,
aligning the first and second portions.

* * * * *